United States Patent

[11] 3,611,419

[72] Inventor John Blumenthal
Wickliffe, Ohio
[21] Appl. No. 812,821
[22] Filed Apr. 2, 1969
[45] Patented Oct. 5, 1971
[73] Assignee Clevite Corporation
Continuation-in-part of application Ser. No. 37,210, May 14, 1970.

[54] ELECTROGRAPHIC IMAGING SYSTEM AND HEADS THEREFOR
12 Claims, 10 Drawing Figs.
[52] U.S. Cl. .................................................... 346/74 ES
[51] Int. Cl. ..................................................... G01d 15/06
[50] Field of Search........................................... 346/74 ES, 74 E, 74 S, 74 SB; 101/DIG. 13; 250/49.5

[56] References Cited
UNITED STATES PATENTS

| | | | |
|---|---|---|---|
| 2,997,361 | 8/1961 | Christopherson et al. | 346/74 |
| 2,898,468 | 8/1959 | McNaney | 346/74 X |
| 3,112,693 | 12/1963 | Williams | 346/74 X |
| 3,178,718 | 4/1965 | Baron | 346/74 |
| 3,438,053 | 4/1969 | Howell | 346/74 |
| 3,470,563 | 9/1969 | Starr | 346/74 |

Primary Examiner—Bernard Konick
Assistant Examiner—Gary M. Hoffman
Attorney—Eber J. Hyde ABSTRACT: An electrographic imaging system is provided for producing an electrostatic latent image upon an electrographic record medium having dielectric and conductive layers. Electrostatic charging means are provided comprising an array of charging electrode means, some of which are interconnected and thereby are connected to fewer first voltage source means than the total number of charging electrode means in the array. Also provided is an array of complementary electrode means which is connected to second voltage source means. The energized complementary electrode means are capacitively coupled to the conductive layer of the record medium to change the potential thereof upon a voltage pulse being applied to the complementary electrode means. The energized charging electrode means charge discrete areas of the dielectric layer of the record medium only when the complementary electrode means simultaneously are connected to the second source of voltage to effect the capacitive coupling. Also, heads are provided wherein an array of small electrical conductors is supported in a dielectric material in closely spaced relation to each other with the end faces thereof exposed and substantially flush with the support. Complementary electrode means are mounted on the support adjacent to but spaced from the end faces of the electrical conductors and form with the support means a substantially flush, smooth surface over which the record medium can move. Electrical Contacts for both the small electrical conductors and the complementary electrodes are provided in the support.

3,611,419

INVENTOR.
JOHN BLUMENTHAL
BY
*Eben J. Hyde*
ATTORNEY

INVENTOR.
JOHN BLUMENTHAL

ATTORNEY

PATENTED OCT 5 1971 3,611,419

INVENTOR.
JOHN BLUMENTHAL
BY
*Esher J. Hyde*
ATTORNEY 3,611,419

ELECTROGRAPHIC IMAGING SYSTEM AND HEADS THEREFOR

A continuation-in-part application Ser. No. 37,210 was filed May 14, 1970, and assigned to the same assignee as the present application.

BACKGROUND OF THE INVENTION

1. Field of the Invention

This invention relates to electrographic imaging systems and heads and, more particularly, to an electrostatic charging means for forming electrostatic latent images on a record medium in accordance with information received from external electrical signals.

The electrographic recording process is generally characterized by two basic steps. The first step is the establishment of an electrostatic latent image by electrically charging areas on predetermined portions of a record medium by electrostatic recording heads connected to charging circuit means. In the second step the electrostatic latent image is rendered visible by the toning or developing of the charged areas on the record medium.

The present invention is directed to an improvement in the first step, that is, an improved electrographic imaging system for the establishment of the electrically charged areas on the record medium, and to improved heads for charging the record medium. The present invention achieves its highest degree of utility in a system which employs fewer voltage supply circuit means than the total number of charging electrodes.

2. Description of the Prior Art

In general, the prior art provides charging electrodes which terminate adjacent a dielectric layer of the record medium upon which it is desired to deposit an electrostatic charge. A backing bar or electrode of electrically conducting material is located opposite the side of the record medium on which the electrostatic charge is to be deposited. For example, in U.S. Pat. No. 2,919,171, issued Dec. 29, 1959, to Epstein and Phelps, the record medium is threaded between the charging electrodes and the backing bar or electrode and is held in intimate contact with the latter while remaining spaced from the former. The signal information voltage of given polarity is applied to the charging electrodes, and it is not great enough, by itself, to charge an area of the record medium. A supplemental voltage of opposite polarity and of a magnitude insufficient by itself to cause charging of the record medium is applied by physical contact to the backing bar. When the two voltages are simultaneously applied, the resultant total voltage is sufficient to cause an electrical charge to be applied from the charging electrode across the airgap to the surface of the dielectric layer.

An object of the invention is to provide an improved electrostatic recording head and recording system wherein capacitive coupling is utilized, thereby eliminating the necessity of making good physical contact between the head and the record medium.

Another object of the present invention is to provide an electrostatic charging head which can be located only to one side of the record medium thereby eliminating backing electrodes and providing easier threading of the record medium across the electrostatic charging means.

A further object of the present invention is to provide an electrographic imaging system that because of capacitive coupling is essentially insensitive to the thickness and variation in thickness of the record medium.

A further object of the present invention is to eliminate the necessity of maintaining alignment between the charging electrodes and the backing electrodes.

A still further object of the present invention is to reduce the hazard of accidental electrical shorting between a backing electrode and a charging electrode.

Further objects and advantages of the invention will appear from the following detailed description to be read in conjunction with the accompanying drawings wherein like reference symbols denote corresponding parts throughout the several views.

SUMMARY OF THE INVENTION

In accordance with the present invention, there is provided an electrographic imaging system for use with a record medium having a dielectric layer with an exposed surface and having a conductive layer in contact with the opposite face of the dielectric layer. Charging electrode means having end face means are mounted adjacent to the surface of the dielectric layer, and complementary electrode means are mounted adjacent to the record medium and in closely spaced proximity to the charging electrode means. Voltage less than the critical value required for imaging is applied to the charging electrode from first voltage means. A pulse of voltage less than the critical value is applied to the complementary electrode means from a second voltage source. The complementary electrode means are capacitively coupled to the conductive layer of the record medium. The voltage pulse by virtue of capacitive coupling changes the potential of the conductive layer directly adjacent the charging electrode means in coincidence with the voltage applied to the charging electrode means to form on the record member an electrostatic latent image of the end face means of the charging electrode.

Further, in accordance with the invention, there are provided electrostatic charging heads for use with the aforedescribed record medium, wherein an array of small electrical conductors is supported in a dielectric material in closely spaced relation to each other with the end faces thereof exposed and substantially flush with the support. Complementary electrode means are mounted on the support adjacent to but spaced from the end faces of the electrical conductors and form with the support means a substantially flush, smooth surface over which the record medium can move. Electrical contacts for both the small electrical conductors and the complementary electrodes are provided in the support.

DESCRIPTION OF THE PREFERRED EMBODIMENTS

Figure 1:
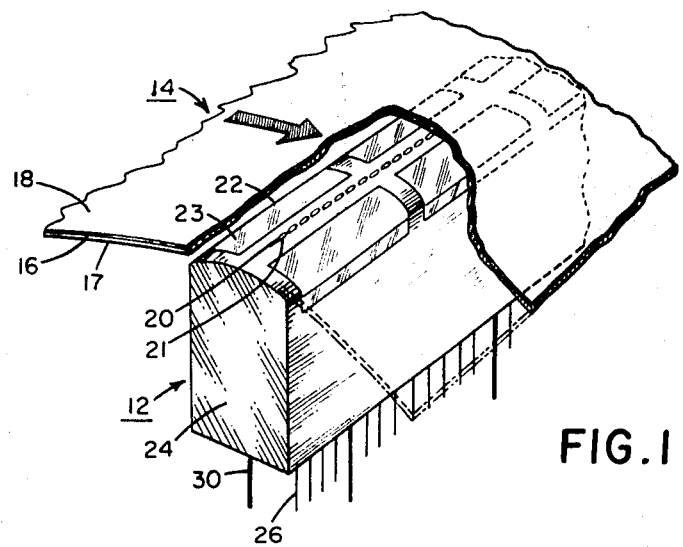
FIG. 1 is a perspective view of a portion of an electrostatic charging means or head adjacent to the exposed surface of a dielectric layer of an electrographic record medium on which an electrostatic latent image is to be formed; the head being a single-row aligned head.

Referring to FIG. 1 of the drawing, there is shown an electrographic imaging system and head embodying the present invention. An electrostatic charging means or head 12 is shown with an electrographic record medium 14 which is given relative displacement to the charging means 12 by means not shown.

The electrographic record medium 14 comprises a dielectric layer or stratum 16 in contact with a conductive layer or stratum 18. The dielectric layer 16 has an exposed charge retentive surface 17 which, in operation, substantially engages the surface of the charging means 12. Alternatively, the record medium may comprise a conductive layer between two layers, the top layer being less conductive than the middle layer.

The charging means or head 12 comprises a linear array of closely spaced charging electrode means 20 having relatively small-area exposed portions or ends 21, and complementary electrode means 22 having relatively large-area exposed portions 23.

The charging electrode means 20 are generally small, closely spaced, electrical conductors embedded in a support 24 composed of a suitable dielectric material such as a plastic or a ceramic, with their end faces 21 substantially flush with the end surface of support 24. By way of illustration, the charging electrode means 20 can be approximately 10 mils in diameter and spaced on approximately 12.5-mil centers so that they are separated by about 2.5 mils. The charging electrode means 20 shown in FIG. 1 are arranged in a linear array; however, they are adaptable to a variety of nonlinear arrangements and may represent alpha-numeric symbols or the like.

In operation, it is required that the capacitance of the complementary electrode means 22 to the conductive layer 18 of the electrographic medium 14 be large as compared to the capacitance of the charging electrode means 20 to said conductive layer. The capacitance between the complementary electrode means 22 and the conductive layer is preferably 10 or more times the capacitance of the sum of the charging electrode means 20 to the conductive layer. Since capacitance is directly proportional to the physical area of the plates of a capacitor, the exposed surface portion means 23 of a complementary electrode means 22 preferably is at least 10 times that of the sum of the exposed end portion means 21 of an associated group of charging electrode means 20.

The complementary electrode means 22 are mounted on the support 24 so that their surfaces 23 are substantially flush with the end surface of the support 24 and the end faces 21 of the charging electrodes 20, forming a smooth, preferably slightly curved surface which the record medium engages during operation of the system. The complementary electrode means 22 are generally rectangularly shaped electrical conductors having their long sides in a parallel relationship to each other, and having the charging electrode means 20 centered between and parallel to two complementary electrode means 22. While the exposed portion means 23 of the complementary electrode means 22 are shown as electrical conductors they can include a dielectric coating 23' (see FIG. 4). In such a case the thickness of the dielectric coating 23' is dependent on the dielectric coefficient of the material. An example of a dielectric material which has been used successfully is barium titanate. The coating 23' provides complete protection against accidental shorting.

Figure 2:
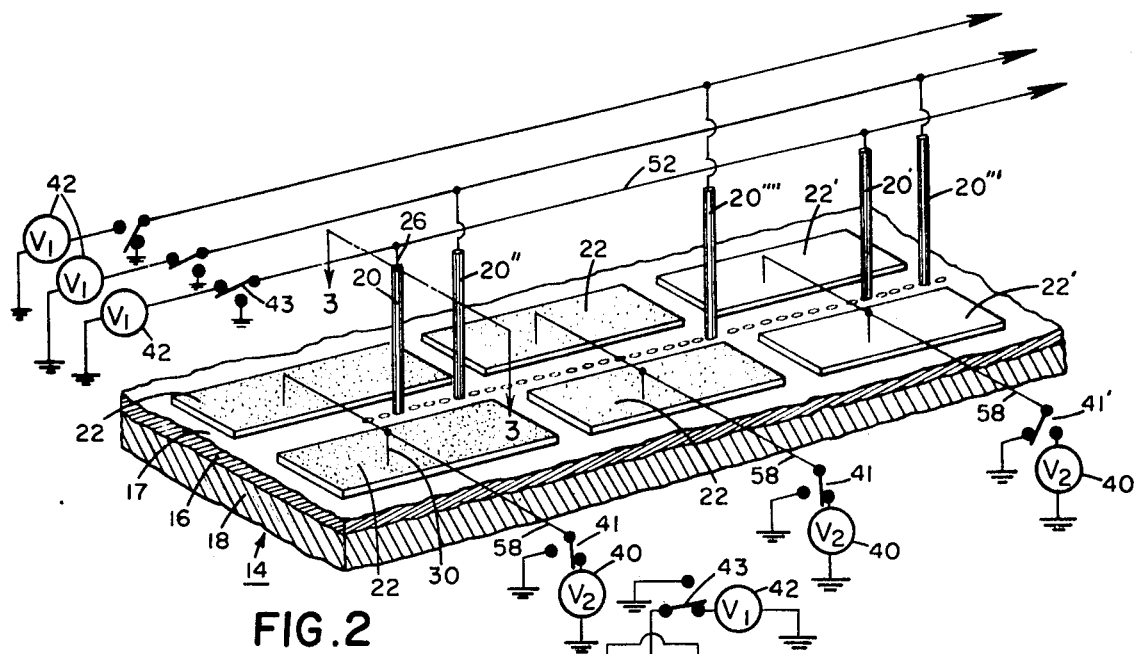
FIG. 2 is a diagrammatic representation of a portion of an electrostatic imaging system, and of a head with portions removed, adjacent to the electrographic record medium.

The charging electrode means 20 extend down into the support 24 and by means of conductors 26 are connected first voltage circuit means 42 (FIG. 2). Conductors 30 are internally connected to the complementary electrodes 22 and extend through the support 24 to complementary voltage circuit means 40. The voltage circuit means 40 and 42 receive electrical signals from logic circuits adaptable to the particular application for the graphic display unit such as computer printout, data-plotter, oscillograph, etc.

The area of the exposed portion means 23 of each complementary electrode means 22, as shown in the present embodiment, is substantially greater than the area of the exposed portion means 21 of the charging electrode means 20 flanked by the complementary electrode means. This is in accordance with the area requirements which are essential to provide the proper capacitive relationships in this invention. By way of illustration, the exposed portion means 23 may be approximately 312 mils long and approximately 200 mils wide. Thus, 25 charging electrode means, each about 10 mils in diameter, would have a total area of about 2,000 square mils and the two complementary electrode means 22 would have an area of about 125,00 square mils.

OPERATION OF THE ELECTROSTATIC CHARGING MEANS

As the record medium 14 moves across the electrographic charging means 12, the charging electrode means 20 and the complementary electrode means 22 are in close proximity to one side of the record medium 14. Preferably, the exposed surface 17 of the record medium 14 is spaced at a given very short distance from the exposed portion means 21 of the charging electrode means 20 to regularize the discharge from the charging electrode means. This can be accomplished by using a record medium that assures a minimum spacing between the electrode means and the record medium by the record medium itself, as provided in copending U.S. Pat. application Ser. No. 694,654, filed Dec. 29, 1967, in the names of Arling Dix Brown, Jr., and John Blumenthal, and assigned to the same assignee as the present invention.

First voltage means 42 are electrically connected by conductors 26 and 52 to the charging electrode means 20 and 20' for applying thereto, when switch 43 is closed, a first voltage of given polarity and of a first predetermined amplitude.

Second voltage means 40 are electrically connected to the complementary electrode means 22 by conductors 30 and 58, when switch 41 is closed, for applying thereto a voltage pulse of polarity opposite to the aforesaid given polarity, and of a second predetermined amplitude. This voltage pulse must have a duration sufficiently long to change by capacitive coupling the potential of the conductive layer 18 under the charging electrode means. This change of potential in coincidence with the presence of the first voltage at the charging electrode means 20 causes an electrostatic latent image of the exposed end 21 of the charging electrode 20 to be formed on the record medium at a location opposite the charging electrode means. It is only when voltage is applied to charging electrode means 20 in coincidence with the proper potential in the conductive layer 18 established by capacitive coupling with the energized complementary electrodes that an electrostatic image will be formed. If either condition is absent, no image will be formed.

The adjacent pair of complementary electrode means 22' (that are not shaded) are not energized as switch 41' at this instant is connected to ground. Charging electrode means 20' are connected by line 52 to voltage source 42 and are therefore energized through closed switch 43, but there is no electrification of the charge retentive surface 17 by electrode means 20' because there is no simultaneous supplemental voltage from the adjacent complementary electrode means 22'. To cause charging electrode 20' to produce an electrostatic image the energizing of complementary electrodes 22' adjacent to it would be required. This is shown, described, and claimed in U.S. Pat. application Ser. No. 868,394 filed Oct. 22, 1969, in the name of Arling Dix Brown for an Electrographic Recording System, and assigned to the same assignee as the present application.

In the present embodiment there are two rows of flanking complementary electrode means. The system of the present invention will also work by using a single row of complementary electrode means, but usually with an attending degradation in performance stemming from less effective capacitive coupling of the opposite polarity voltage pulse into the region of the charging electrode means with which it is desired to make an electrostatic latent image on the surface of the record medium.

Figure 3:
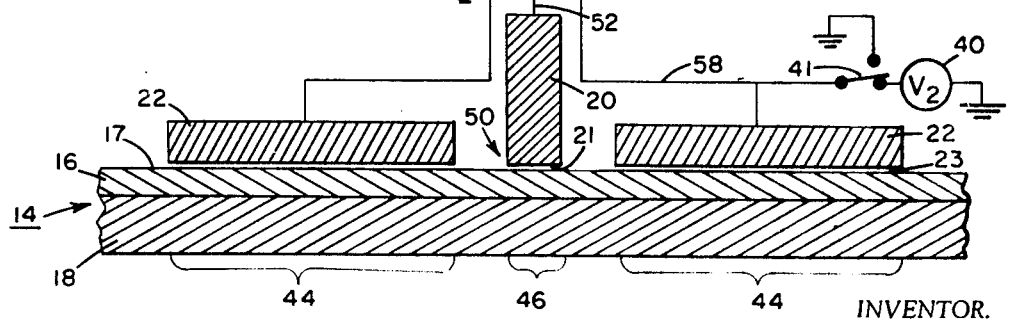
FIG. 3 is a cross-sectional view along line 3—3 in FIG. 2, illustrating the relationship of the charging electrode means and the complementary electrode means to the record medium.

Referring to FIG. 3, an enlarged cross-sectional view of a charging electrode means 20 and a pair of complementary electrode means 22 are shown to illustrate the capacitive coupling between the electrostatic charging means and the record medium. When the second voltage from voltage means 40 is applied to the complementary electrode means 22, the capacitive coupling to the portions of the conductive layer 18 within the brackets 44 cause these area to rise in potential. The portion of the conductive layer 18 indicated by bracket 46 must reach a voltage sufficiently high that when the first voltage from means 42 is applied to the charging electrode means 20, the total potential difference across the gap 50 is equal to or greater than the critical charging potential. This causes an electrostatic latent image of the electrode means 20 to be formed on the surface 17 of the dielectric layer 16 at a location directly under the charging electrode means 20.

EFFECT OF THE CHARACTERISTICS OF THE RECORD MEDIUM

Figure 5:
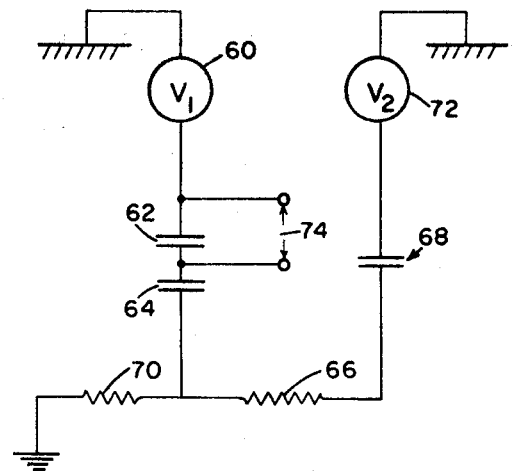
FIG. 5 is a simplified equivalent circuit representing the components as shown in FIG. 4 and having the equivalent circuit elements arranged in parallel position to these components.

The following discussion is based on the simplified equivalent circuit, FIG. 5, using lumped values to approximate the actual distributed resistances and capacitances.

Figure 4:
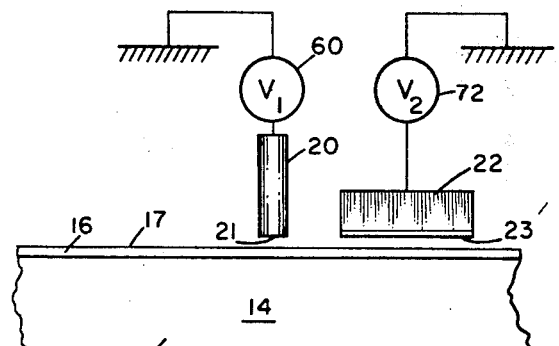
FIG. 4 is a diagrammatic representation of one charging electrode means and an adjacent complementary electrode means in conjunction with the electrographic record medium.

Considered in this equivalent circuit are the effects produced by one charging electrode means 20 and an adjacent complementary electrode means 22 in conjunction with the electrographic record medium 14 as shown in FIG. 4. First voltage means $V_1$ 60 represent signal voltage applied to the charging electrode means 20 which preferably are of negative polarity with respect to the conductive stratum 18 of the record medium. Second voltage means $V_2$ 72 represent the voltage pulse applied to the complementary electrode means 22 and which is generally a pulse of similar magnitude but of opposite polarity to the voltage applied to the charging electrode means 20. Capacitor 62 represents the capacitance from the exposed portion means 21 of the charging electrode means 20 to the adjacent charge retentive surface 17 of the dielectric layer 16 of the record medium 14. Capacitor 64 represents the capacitance between the exposed charge retentive surface 17 of the dielectric layer 16 and the conductive layer 18 of the record medium 14, under the charging electrode means 20. Since capacitors 62 and 64 can be considered as a voltage divider, it becomes desirable that the capacitance of capacitor 62 be small compared to the capacitance of capacitor 64. The plate separation for both capacitors being essentially identical in most practical instances, flexibility of choice of dielectric material used for the coating 17 on the medium provides some measure of control of this ratio.

Resistor 66 represents the resistance of the conductive layer 18 of the record medium 14 along the path linking the area adjacent the complementary electrode means 22 and the are under the charging electrode means 20. The effective value of resistor 66 is determined by the geometry of the electrostatic charging means and the sheet resistance of the conductive layer 18 of the record medium 14. The resistor 66 coacts primarily with the capacitors 62, 64, and 68 to determine the rise time of the voltage across the gap, i.e., across capacitor 62. Thus, if the value of resistor 66, as determined by the geometry of the electrostatic charging means and the sheet resistance of the conductive layer, is very large, the rise time will be increased and may not allow critical charging potential to be attained within the required time.

Capacitor 68 represents the capacitance between the electrode means 22 and the conductive layer 18 of the record medium 14. Capacitor 68 has a high capacitance compared to the capacitance of capacitors 62 and 64 in series, e.g., 10 to 50 times greater.

Resistor 70 represents the resistance of the conductive layer 18 from the area to be energized to ground. The resistance of resistor 70 is determined by sheet conductance of the conductive layer of the record medium and by grounding geometry. The resistor 70 coacts primarily with capacitor 68 in determining the decay time of the voltage coupled into the energized area. For proper operation, the gap voltage (the voltage across capacitor 62) must reach critical value when $v_2$ is applied during the presence of $V_1$ In a functional system, where pulses as short as 1.0 microsecond were employed, it was discovered that satisfactory performance could be obtained using record media with conductive layers having sheet resistances ranging from 0.25 to 1.0 megohm/sq. Suitable thicknesses for the dielectric layer range from 0.1 to 0.25 mil. Using the embodiment heretofore described, and utilizing the invention of U.S. Pat. application Ser. No. 694,654, it has been found that the total voltage required for obtaining the critical charging potential between the charging electrode means and the record medium is approximately 500 volts.

FIG. 1 shows a head with a single line of charging electrodes 20 extending at an angle of 90° to the direction of motion of the record member. If the electrodes are 10 mils in diameter and are spaced 2.5 mils apart, they are capable of drawing a latent image across the record medium which, when toned, would produce a dark grey line due to the halftone effect. In the straight-line head the maximum electrode diameter is approximately the electrode spacing. In order to produce a continuous black line, different head and electrode arrangements are necessary.

Figure 6:
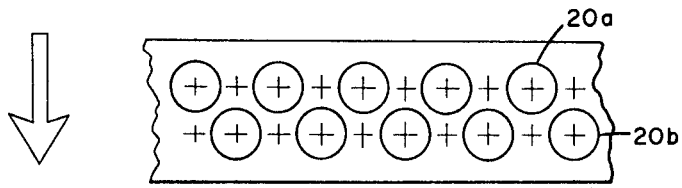
FIG. 6 shows schematically the arrangement of larger charging electrodes in a two-row offset head for denser recording.
Figure 7:
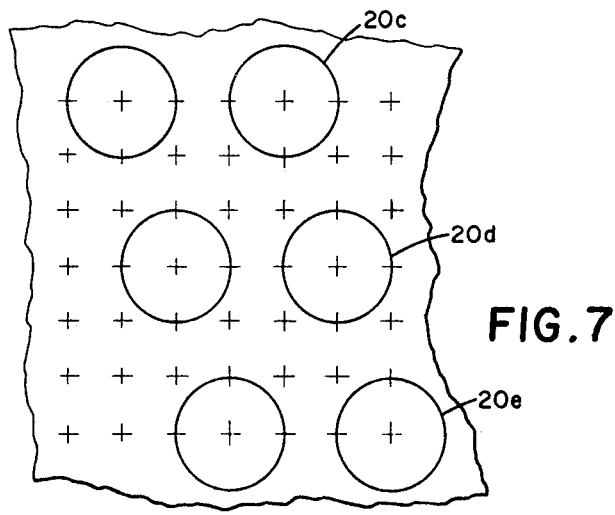
FIG. 7 shows schematically the arrangement of still larger charging electrodes in a three-row offset head for denser recording.
Figure 8:
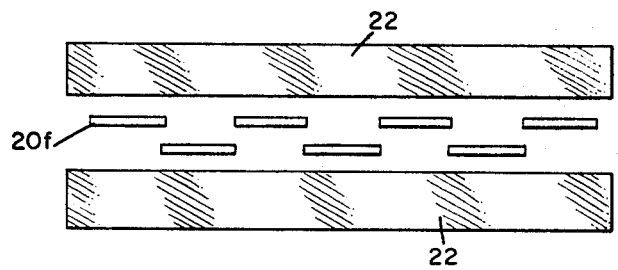
FIG. 8 schematically shows rectangular charging electrodes in a charging head for denser recording.

FIGS. 6, 7, and 8 show alternate arrangements for the charging electrodes of a head.

In FIG. 6 there is shown two spaced-apart rows of electrodes 20A and 20B, and the arrow indicates the direction of motion of the record medium in respect thereto. This arrangement is particularly useful where more solid black is required, and where larger diameter charging electrodes are wanted. The electrodes 20B should be staggered in respect to the electrodes 20A. Overlapping imprints can be obtained by advancing the paper. In this arrangement the diameter of the electrode can be larger than the nominal electrode spacing which is not true of the straight-line head.

FIG. 7 shows an arrangement wherein the charging electrodes are arranged in three spaced-apart, staggered rows 20C, –D, –E. This configuration is useful when still larger diameter electrodes are used and, as shown, the left-hand side of the electrodes 20D overlap the right-hand side of the electrodes 20C by an amount equal to one-half diameter, and the left-hand side of electrodes 20E overlap the right-hand side of electrodes 20D by one-half diameter, and the right-hand side of electrodes 20E overlap the left-hand side of electrodes 20C by one-half diameter. This will give good resolution at higher image density. With this arrangement the electrode diameter can be larger than two times the nominal electrode spacing; i.e., up to approximately three times the nominal spacing indicated by the marks.

It is not essential that the charging electrodes be round in cross section. FIG. 8 shows rectangular charging electrodes 20F in two spaced, staggered rows, between complementary electrodes 22. This arrangement is similar to the arrangement of FIG. 6 in respect to producing a substantial solid line after toning. Similar to FIG. 7, the rectangular electrodes can overlap each other.

Figure 10:
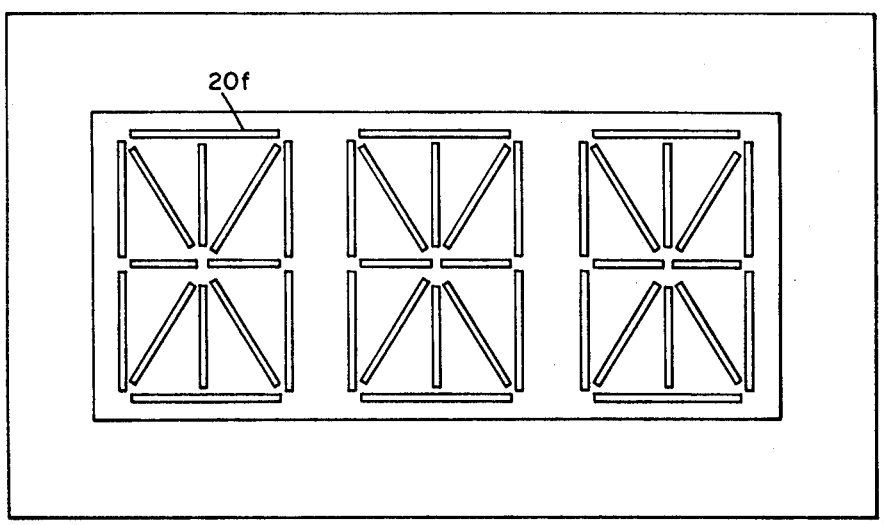
FIG. 10 schematically shows rectangular charging electrodes arranged in groups wherein each group is capable of producing alpha-numeric characters.

FIG. 10 shows the rectangular charging electrodes 20F may be arranged in groups, matrixlike, so that by selection of the proper electrodes, letters and numerals may be obtained.

Figure 9:
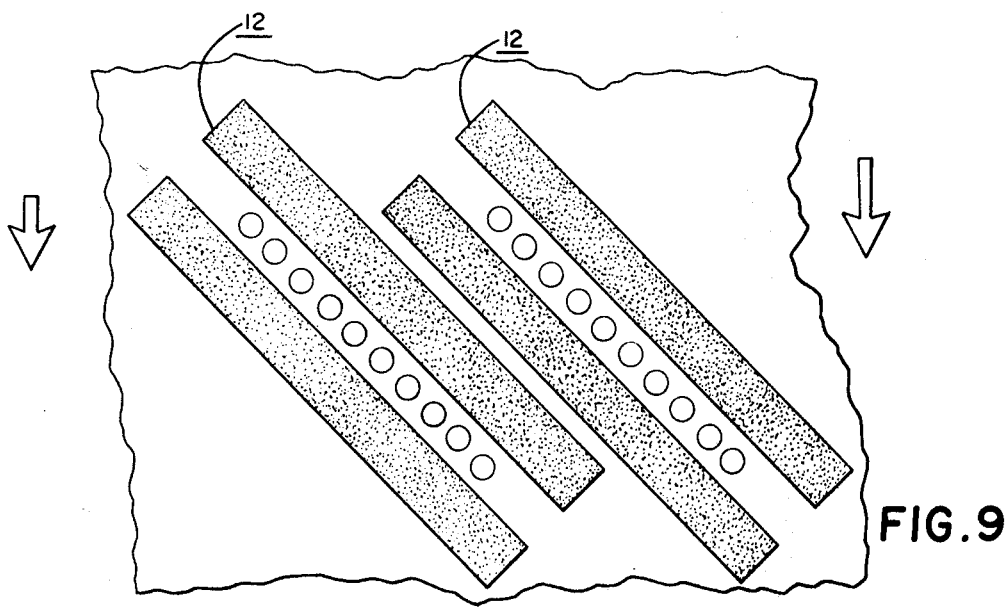
FIG. 9 shows angularly related single-row charging heads for denser recording than is obtained from the head shown in FIG. 1.

FIG. 9 indicates an arrangement wherein a plurality of the recording heads 12, shown in FIG. 1, are mounted with the electrode line at an angle other than 90° to the direction of motion of the record member. For example, as shown, the heads 12 are at 45° to the direction of motion. By properly relating the charging electrode diameter, the spacing between the electrodes, and the head angle, the system can produce essentially solid lines giving records with good contrast.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What I claim as new and desire to secure by Letters Pat. Of the U.S. is:

1. In an electrographic imaging system comprising a record medium having a conductive layer in contact with a dielectric layer with an exposed surface, and an electrostatic charging means including:

charging electrode means having end face means adjacent to said exposed surface of said dielectric layer;

complementary electrode means adjacent to said record medium and positioned in spaced proximity to said charging electrode means;

first voltage means electrically connected to said charging electrode means for applying thereto a first voltage of given polarity and of a first predetermined amplitude;

second voltage means electrically connected to said complementary electrode means for applying thereto a voltage pulse of polarity opposite to said given polarity and of a second predetermined amplitude, said voltage pulse having a duration sufficiently long to change by capacitive coupling and ohmic connection the potential of said conductive layer under said charging electrode means, said change of potential in coincidence with the presence of said first voltage at said charging electrode means causing an electrostatic latent image of the end face means said charging electrode means to be formed on said medium at a location opposite said charging electrode means, said first voltage alone and said voltage pulse on said complementary electrode means alone being insufficient to cause an electrostatic latent image to be formed.

2. In an electrographic imaging system comprising a record medium having a conductive layer in contact with a dielectric layer with an exposed surface, and an electrostatic charging means including:

charging electrode means having end face means adjacent to said dielectric layer;

complementary electrode means having portion means adjacent to said record medium and positioned in spaced proximity to said charging electrode means;

first voltage means electrically connected to said charging electrode means for applying thereto a first voltage of given polarity and of a first predetermined amplitude;

second voltage means electrically connected to said complementary electrode means for applying thereto a voltage pulse of polarity opposite to said given polarity and of a second predetermined amplitude;

said voltage pulse producing a change by capacitive coupling of the voltage of that portion of the conductive layer directly opposite said complementary electrode means, and said change producing by ohmic connection a change in the potential of a portion of the conductive layer under said charging electrode means, said change of potential of said conductive layer under said charging electrode means in coincidence with the presence of said first voltage at said charging electrode means causing an electrostatic latent image of the end face means of said charging electrode means to be formed on said medium at a location opposite said charging electrode means, said first voltage alone and said voltage pulse on said complementary electrode means alone being insufficient to cause an electrostatic latent image to be formed.

3. An electrostatic charging system as set forth in claim 2 wherein said complementary electrode means and said charging electrode are on the same side of the medium.

4. An electrostatic charging system as set forth in claim 2 wherein said complementary electrode means and said charging electrode means are on opposite sides of the medium.

5. An electrostatic charging means as set forth in claim 2 wherein at least a portion of said complementary electrode means is a dielectric material.

6. An electrostatic charging head for use with a relatively moving record medium comprising:

an array of small electrical conductors each having an end face having a given length in the direction of motion of said record medium.

support means formed of dielectric material supporting said array of electrical conductors in closely spaced relation to each other with the said end faces exposed and substantially flush with a face of said support means, complementary electrode means having an area large compared to the total area of the end faces of said array of small electrical conductors, and having a given length in the direction of motion of said record medium substantially greater than the said given length of said small electrical conductors.

said complementary electrode means being mounted on said support means adjacent to but spaced from the end faces of said small electrical conductors forming with said support means and with the ends of said small electrical conductors a substantially flush, smooth surface over which said record medium can move, and electrical contacts mounted on said support means in electrical contact with said array of small electrical conductors and in electrical contact with said complementary electrode means.

7. An electrostatic charging head as set forth in claim 6, further characterized by said array of small electrical conductors comprising a first line of conductors extending in a direction transverse to the direction of motion of said record member, and a second line of conductors spaced closely adjacent said first line of conductors and extending parallel thereto, the individual conductors forming said second line being staggered in respect to the individual conductors forming said record line.

8. An electrostatic charging head as set forth in claim 6, further characterized by the end faces of said small electrical conductors being round.

9. An electrostatic charging head as set forth in claim 6, further characterized by the end faces of said small electrical conductors being rectangular.

10. An electrostatic charging head as set forth in claim 6, further characterized by:

said array of small electrical conductors comprising a plurality of groups of small rectangular electrical conductor, each of said groups of rectangular conductors defining a matrix for forming a character.

11. An electrostatic charging head as set forth in claim 6, further characterized by said array of small electrical conductors extending in a line transverse to the direction of motion of said record member, and by said complementary electrode means comprising a plurality of electrodes at least one on either side of said array.

12. An electrostatic charging head as set forth in claim 11 further characterized by said line transverse to the direction of motion of said record member being at a given angle other than 90° thereto, and by said complementary electrode means extending at said given angle.